(12) United States Patent
Lee et al.

(10) Patent No.: US 8,128,880 B2
(45) Date of Patent: Mar. 6, 2012

(54) NOX REDUCTION CATALYST AND EXHAUST SYSTEM USING THE SAME

(75) Inventors: Jin Ha Lee, Seoul (KR); Hyokyung Lee, Yongin (KR); Sangmin Lee, Yongin (KR); Jun Sung Park, Yongin (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 12/604,090

(22) Filed: Oct. 22, 2009

(65) Prior Publication Data

US 2010/0223919 A1 Sep. 9, 2010

(30) Foreign Application Priority Data

Mar. 9, 2009 (KR) ........................ 10-2009-0019868

(51) Int. Cl.
*B01D 50/00* (2006.01)
*B01D 29/06* (2006.01)
(52) U.S. Cl. .............................. 422/171; 502/64; 502/61
(58) Field of Classification Search .................. 422/171, 422/177, 180; 502/61, 64, 223; 60/276, 60/286
See application file for complete search history.

(56) References Cited

U.S. PATENT DOCUMENTS

| 6,066,587 | A | * | 5/2000 | Kurokawa et al. | 502/66 |
| 6,615,580 | B1 | * | 9/2003 | Khair et al. | 60/286 |
| 6,677,264 | B1 | | 1/2004 | Klein et al. | |
| 2008/0115485 | A1 | * | 5/2008 | Lee | 60/276 |
| 2008/0148715 | A1 | * | 6/2008 | Osumi et al. | 60/295 |

FOREIGN PATENT DOCUMENTS

EP 1 889 651 A1 2/2008

* cited by examiner

*Primary Examiner* — Tom Duong
(74) *Attorney, Agent, or Firm* — Morgan, Lewis & Bockius LLP

(57) ABSTRACT

An NOx reduction catalyst and an exhaust system using the same may include an NOx reduction catalyst mounted at an exhaust pipe through which exhaust gas passes, wherein the NOx reduction catalyst includes first and second catalyst layers coated on a carrier, the first catalyst layer being disposed close to the exhaust gas, and the second catalyst layer being disposed close to the carrier, wherein a portion of nitrogen oxide contained in the exhaust gas is oxidized while passing through the first catalyst layer, and the oxidized nitrogen oxide is stored in the second catalyst layer, wherein the nitrogen oxide stored in the second catalyst layer is released through a substitution reaction with an additionally injected fuel, and wherein the released nitrogen oxide is reduced by the additionally injected fuel in the first catalyst layer.

19 Claims, 5 Drawing Sheets

US 8,128,880 B2

NOX REDUCTION CATALYST AND EXHAUST SYSTEM USING THE SAME

CROSS-REFERENCE TO RELATED APPLICATION

This application claims priority to Korean Patent Application No. 10-2009-0019868 filed on Mar. 9, 2009, the entire contents of which are incorporated herein for all purposes by this reference.

BACKGROUND OF THE INVENTION

1. Field of the Invention

The present invention relates to an NOx reduction catalyst and an exhaust system using the same. More particularly, the present invention relates to an NOx reduction catalyst and an exhaust system using the same which improve purification efficiency of nitrogen oxide as a consequence of storing the nitrogen oxide contained in exhaust gas and releasing the stored nitrogen oxide when a reduction reaction of the nitrogen oxide is activated.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate material (PM) contained in the exhaust gas is mounted in the exhaust pipe.

A selective catalyst reduction (SCR) apparatus is one type of such a catalytic converter. In the selective catalyst reduction (SCR) apparatus, reducing agents such as urea, ammonia, carbon monoxide, and hydrocarbon (HC) react better with nitrogen oxide than oxygen.

According to an internal combustion engine at which such a selective catalyst reduction apparatus is mounted, additional injection of fuel is continuously performed according to an amount of the nitrogen oxide contained in the exhaust gas. Therefore, hydrocarbon slip may occur and fuel consumption may be increased.

In addition, in a case that a reducing agent is continuously supplied, an oxidation-reduction reaction also occurs continuously. Therefore, durability of the catalyst may be deteriorated by oxidation heat occurring in the oxidation-reduction reaction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an NOx reduction catalyst and an exhaust system using the same having advantages of improving purification efficiency of nitrogen oxide as a consequence of storing nitrogen oxide contained in exhaust gas and releasing the stored nitrogen oxide by additionally injecting fuel in a predetermined period.

In an aspect of the present invention, an NOx reduction catalyst may be mounted at an exhaust pipe through which exhaust gas passes, wherein the NOx reduction catalyst includes first and second catalyst layers coated on a carrier, the first catalyst layer being disposed close to the exhaust gas, and the second catalyst layer being disposed close to the carrier. The first catalyst layer reduces a portion of nitrogen oxide contained in the exhaust gas through an oxidation-reduction reaction with an unburned fuel or hydrocarbon contained in the exhaust gas, and diffuses the other portion of the nitrogen oxide to the second catalyst layer, and the second catalyst layer stores the diffused nitrogen oxide and releases the stored nitrogen oxide by a fuel additionally injected in a predetermined period such that the stored nitrogen oxide is reduced at the first catalyst layer.

The first catalyst layer may include at least one of zeolite catalysts and metal catalysts supported in porous alumina.

The zeolite catalyst may be a catalyst where at least one element among copper, platinum, manganese, iron, cobalt, nickel, zinc, silver, cerium, and gallium is ion-exchanged.

At least one metal element among platinum, palladium, rhodium, iridium, ruthenium, tungsten, chromium, manganese, iron, cobalt, copper, zinc, and silver may be supported in the porous alumina.

The second catalyst layer may include a noble metal and an NOx storing material.

The predetermined period may come when the nitrogen oxide in the second catalyst layer is larger than or equal to a predetermined value such that reduction reaction of the nitrogen oxide is activated in the first catalyst layer.

The additional injection of the fuel may be performed through post injection of an injector mounted at an engine or secondary injection of an injector mounted at the exhaust pipe.

The NOx reduction catalyst may further include a diesel fuel activation material disposed at the NOx reduction catalyst, wherein the diesel fuel activation material activates the additionally injected fuel.

In another aspect of the present invention, an exhaust system may include an NOx reduction catalyst mounted at an exhaust pipe through which exhaust gas passes, wherein the NOx reduction catalyst includes first and second catalyst layers coated on a carrier, the first catalyst layer being disposed close to the exhaust gas, and the second catalyst layer being disposed close to the carrier. A portion of nitrogen oxide contained in the exhaust gas is oxidized while passing through the first catalyst layer and the oxidized nitrogen oxide is stored in the second catalyst layer, the nitrogen oxide stored in the second catalyst layer is released through a substitution reaction with additionally injected fuel, and the released nitrogen oxide is reduced by the additionally injected fuel in the first catalyst layer.

Supply of the additionally injected fuel may be controlled such that a ratio of hydrocarbon to the nitrogen oxide is greater than or equal to a predetermined ratio so as to activate the reduction reaction of the nitrogen oxide in the first catalyst layer.

The first catalyst layer may include at least one of zeolite catalysts and metal catalysts supported in porous alumina.

The zeolite catalyst may be a catalyst where at least one element among copper, platinum, manganese, iron, cobalt, nickel, zinc, silver, cerium, and gallium is ion-exchanged.

At least one metal element among platinum, palladium, rhodium, iridium, ruthenium, tungsten, chromium, manganese, iron, cobalt, copper, zinc, and silver may be supported in the porous alumina.

The second catalyst layer may include a noble metal and an NOx storing material.

The additional injection of the fuel may be performed through post injection of an injector mounted at an engine or secondary injection of an injector mounted at the exhaust pipe.

The exhaust system may further include a diesel fuel activation material disposed at the NOx reduction catalyst, wherein the diesel fuel activation material activates the additionally injected fuel so as to activate the reduction reaction of the nitrogen oxide occurred in the first catalyst layer.

The diesel fuel activation material may be disposed at the exhaust pipe upstream of the NOx reduction catalyst.

In further another aspect of the present invention, the exhaust system includes a particulate filter disposed at the exhaust pipe upstream of the diesel fuel activation material, wherein the particulate filter traps particulate materials contained in the exhaust gas.

In still further another aspect of the present invention, the exhaust system may include a particulate filter disposed at the exhaust pipe downstream of the NOx reduction catalyst, wherein the particulate filter traps particulate materials contained in the exhaust gas.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
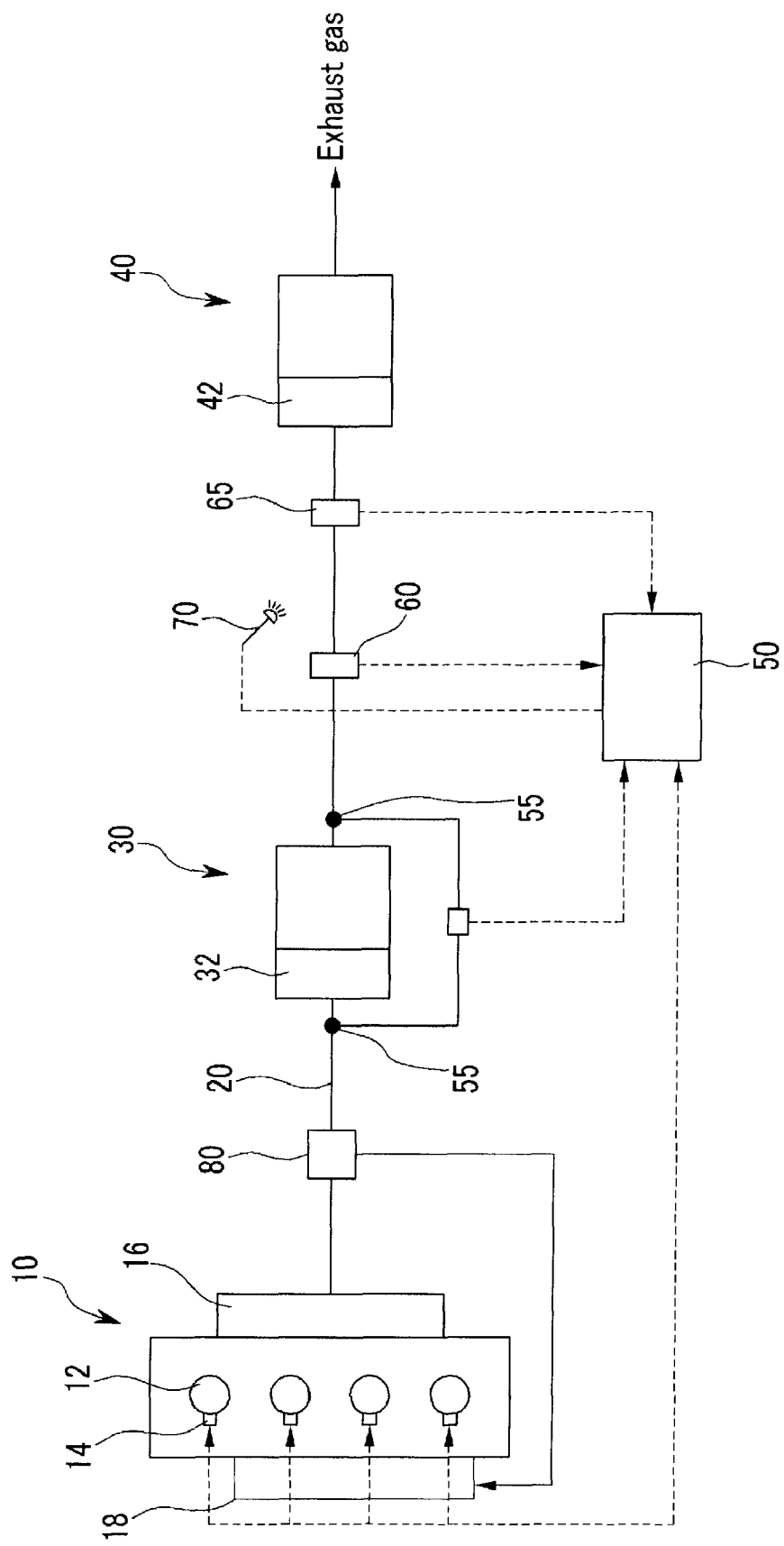
FIG. 1 is a schematic diagram of an exhaust system according to an exemplary embodiment of the present invention which uses an NOx reduction catalyst.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
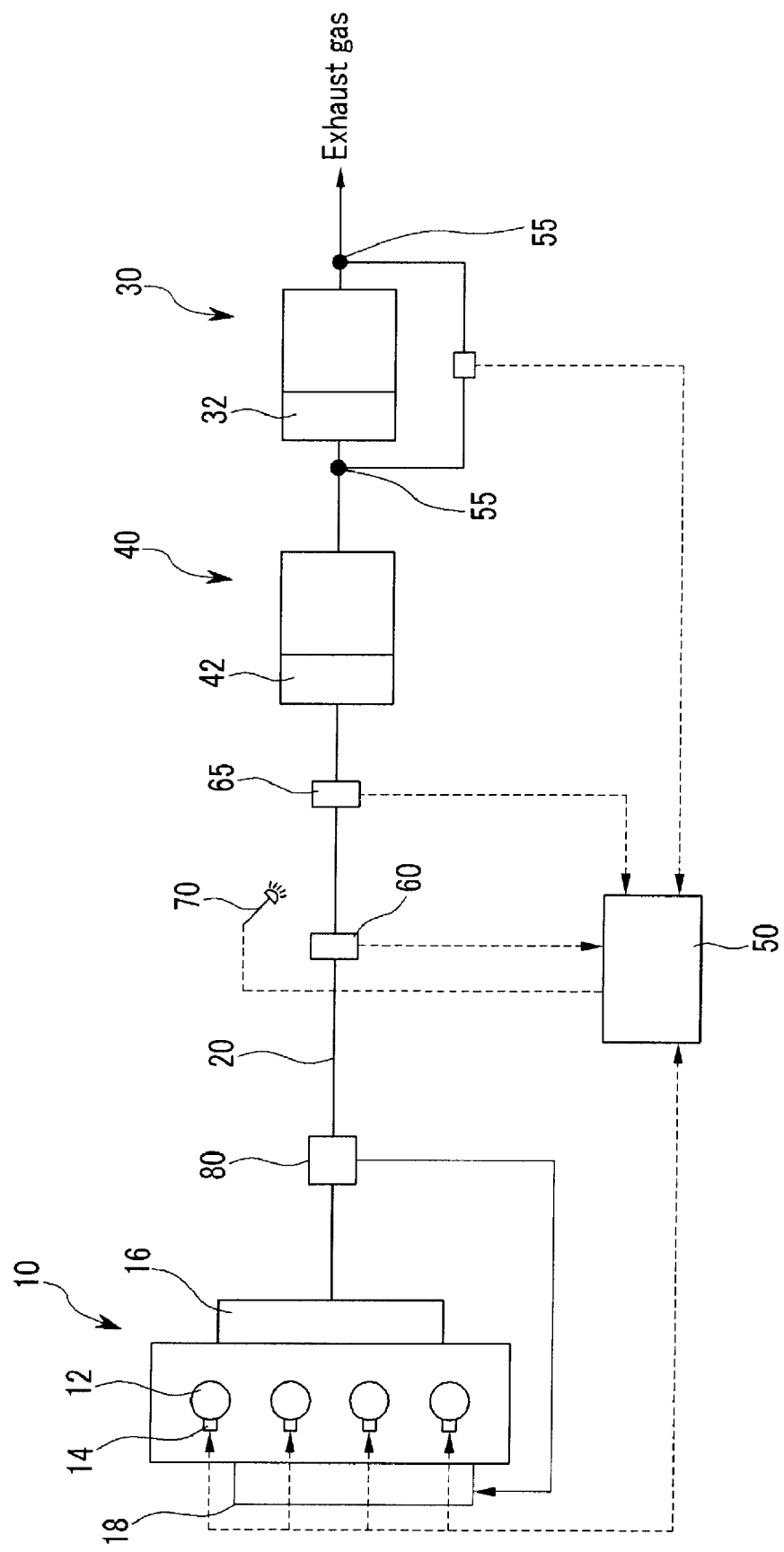
FIG. 2 is a schematic diagram of an exhaust system according to another exemplary embodiment of the present invention which uses an NOx reduction catalyst.

FIG. 1 and FIG. 2 are schematic diagrams of exhaust systems according to exemplary embodiments of the present invention which use an NOx reduction catalyst.

As shown in FIG. 1, an internal combustion engine includes an engine 10, an exhaust pipe 20, an exhaust gas recirculation (EGR) apparatus 80, a particulate filter 30, an NOx reduction catalyst 40, and a control portion 50.

The engine 10 burns an air-fuel mixture in which fuel and air are mixed so as to convert chemical energy into mechanical energy. The engine 10 is connected to an intake manifold 18 so as to receive the air in a combustion chamber 12, and is connected to an exhaust manifold 16 such that exhaust gas generated in a combustion process is gathered in the exhaust manifold 16 and is exhausted to the exterior. A first injector 14 is mounted in the combustion chamber 12 so as to inject the fuel into the combustion chamber 12.

A diesel engine is exemplified herein, but a gasoline engine may be used. In a case that the gasoline engine is used, the air-fuel mixture flows into the combustion chamber 12 through the intake manifold 18, and a spark plug (not shown) is mounted at an upper portion of the combustion chamber 12.

In addition, an engine having various compression ratios, preferably a compression ration lower than or equal to 16.5, may be used.

The exhaust pipe 20 is connected to the exhaust manifold 16 so as to exhaust the exhaust gas to the exterior of a vehicle. The particulate filter 30 and the NOx reduction catalyst 40 are mounted at the exhaust pipe 20 so as to remove hydrocarbon, carbon monoxide, and nitrogen oxide contained in the exhaust gas.

The exhaust gas recirculation apparatus 80 is mounted at the exhaust pipe 20, and the exhaust gas exhausted from the engine 10 passes through the exhaust gas recirculation apparatus 80. In addition, the exhaust gas recirculation apparatus 80 is connected to the intake manifold 18 so as to control the combustion temperature by mixing a portion of the exhaust gas with the air. Such control of the combustion temperature is performed by controlling an amount of the exhaust gas supplied to the intake manifold 18 by control of the control portion 50.

The particulate filter 30 is mounted at the exhaust pipe 20 downstream of the exhaust gas recirculation apparatus 80, and traps particulate material (PM) contained in the exhaust gas exhausted through the exhaust pipe 20. In addition, an oxidizing catalyst 32 is coated at a front portion of the particulate filter 30 so as to oxidize hydrocarbon and carbon monoxide contained in the exhaust gas into carbon dioxide, and to oxidize nitrogen monoxide contained in the exhaust gas into nitrogen dioxide. Herein, the oxidizing catalyst 32 coated at the front portion of the particulate filter 30 is exemplified, but the spirit of the present invention is not limited to this. That is, the oxidizing catalyst 32 may be coated uniformly at an entire region of the particulate filter 30 or may be coated mainly at a specific region of the particulate filter 30. In addition, a particulate filter 30 at which the oxidizing catalyst 32 is not coated can be used.

Meanwhile, pressure difference sensors 55 are mounted respectively at front and rear portions of the particulate filter 30. The pressure difference sensors 55 detect a pressure difference between the front and rear portions of the particulate filter 30, and transmit a signal corresponding thereto to the control portion 50. The control portion 50 controls the particulate filter 30 to be regenerated when the pressure difference detected by the pressure difference sensors 55 is larger than or equal to a predetermined value. In this case, the first injector 14 or an additional injector mounted at the engine 10 can post-inject fuel so as to burn soot trapped in the particulate filter 30.

A hydrocarbon sensor 60 and a second injector 70 are mounted at the exhaust pipe 20 downstream of the particulate filter 30.

The hydrocarbon sensor 60 detects an amount of hydrocarbon contained in the exhaust gas, and transmits a signal corresponding thereto to the control portion 50. Herein, the hydrocarbon represents all compounds consisting of carbon and hydrogen contained in the exhaust gas and the fuel.

The second injector 70 is electrically connected to the control portion 50 and performs secondary injection of the fuel into the exhaust pipe 20 according to control of the control portion 50. Herein, the second injector 70 additionally mounted at the exhaust pipe 20 is exemplified, but the spirit of the present invention is not limited to this. That is, the second injector 70 may be additionally mounted at the engine 10 and may perform additional injection, or the first injector 14 may perform post-injection.

The NOx reduction catalyst 40 is mounted at the exhaust pipe 20 downstream of the second injector 70. The NOx reduction catalyst 40 stores the nitrogen oxide contained in the exhaust gas, and releases the stored nitrogen oxide by the additional injection of the fuel. In addition, the NOx reduction catalyst 40 performs a reduction reaction of the released nitrogen oxide so as to purify the nitrogen oxide contained in the exhaust gas.

A diesel fuel activation (DFA) material 42 is coated at a front portion of the NOx reduction catalyst 40. Herein, the diesel fuel activation material 42 disposed in the NOx reduction catalyst 40 is exemplified, but the diesel fuel activation material 42 may be disposed at an exterior of the NOx reduction catalyst 40.

The diesel fuel activation material 42 cuts a chain ring of carbon compounds contained in the fuel through the catalyst reaction so as to decompose the carbon compounds. That is, the diesel fuel activation material 42 cuts the chain ring constituting hydrocarbon and decomposes the fuel through thermal cracking.

Thermal cracking proceeds as follows.

$$C_{16}H_{34} \rightarrow 2n\text{-}C_8H_{17}{}^* \rightarrow n\text{-}C_6H_{13}{}^* \rightarrow C_4H_9{}^* \rightarrow C_2H_5{}^* \rightarrow C_2H_4$$

$$C_{16}H_{34} \rightarrow 8C_2H_4 + H_2$$

Here, * means a radical.

In addition, the diesel fuel activation material 42 converts a portion of the hydrocarbon into oxygenated hydrocarbon so as to activate the additionally injected fuel.

A nitrogen sensor 65 is mounted at a front portion or a rear portion of the NOx reduction catalyst 40 so as to detect an amount of the nitrogen oxide stored in the NOx reduction catalyst 40, and transmits a signal corresponding thereto to the control portion 50. Meanwhile, instead of using the nitrogen sensor 65, the amount of nitrogen oxide stored in the NOx reduction catalyst 40 may be determined based on a map table set according to a great number of experiments.

The control portion 50 controls the additional injection amount and additional injection timing of the fuel based on the signals detected by each of the sensors 60 and 65 so as to release the nitrogen oxide stored in the NOx reduction catalyst 40. For example, the control portion 50 controls the fuel to be additionally injected when the nitrogen oxide stored in the NOx reduction catalyst 40 is larger than or equal to a predetermined value.

In addition, the control portion 50 controls a ratio of the hydrocarbon to the nitrogen oxide in the exhaust gas to be greater than or equal to a predetermined ratio so as to activate the reduction reaction of the nitrogen oxide in the NOx reduction catalyst 40. The predetermined ratio may be 8.

Meanwhile, as shown in FIG. 2, the engine 10, the EGR apparatus 80, the second injector 70, the NOx reduction catalyst 40, and the particulate filter 30 may be sequentially disposed.

Hereinafter, referring to FIG. 3 to FIG. 5, the NOx reduction catalyst 40 will be further described.

Figure 3:
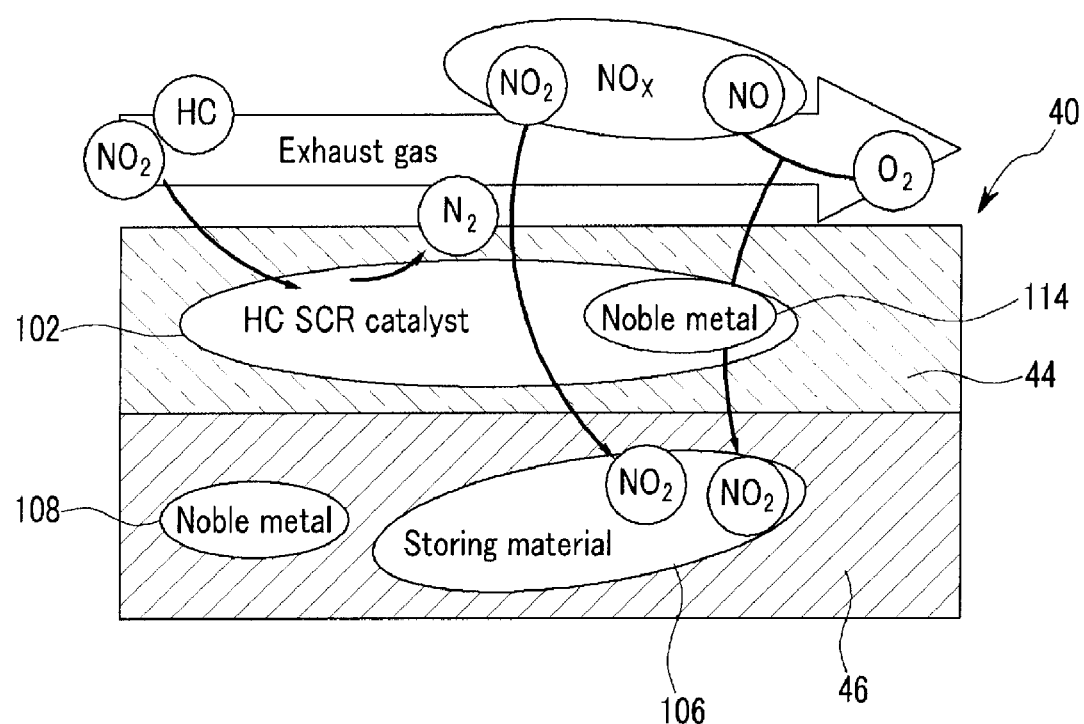
FIG. 3 is a schematic diagram showing that nitrogen oxide is stored in an NOx reduction catalyst according to an exemplary embodiment of the present invention.

FIG. 3 is a schematic diagram showing that nitrogen oxide is stored in an NOx reduction catalyst according to an exemplary embodiment of the present invention; FIG. 4 is a schematic diagram showing that nitrogen oxide is released from an NOx reduction catalyst according to an exemplary embodiment of the present invention; and FIG. 5 is a schematic diagram showing the structure of a first catalyst layer in an NOx reduction catalyst according to an exemplary embodiment of the present invention.

Figure 4:
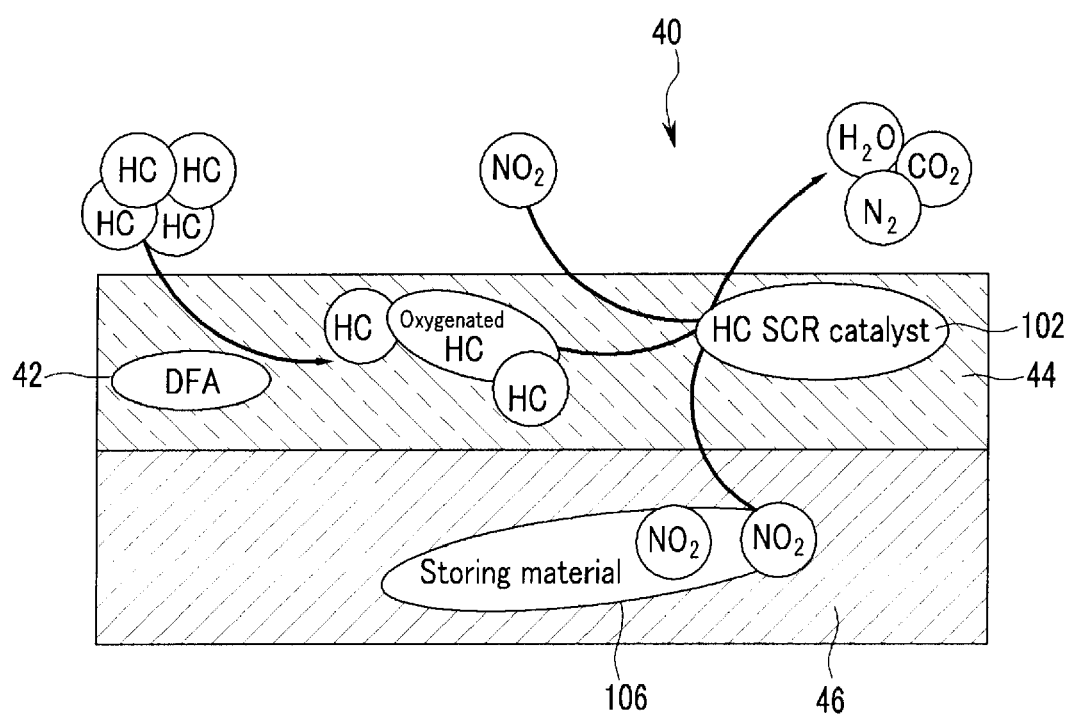
FIG. 4 is a schematic diagram showing that nitrogen oxide is released from an NOx reduction catalyst according to an exemplary embodiment of the present invention.
Figure 5:
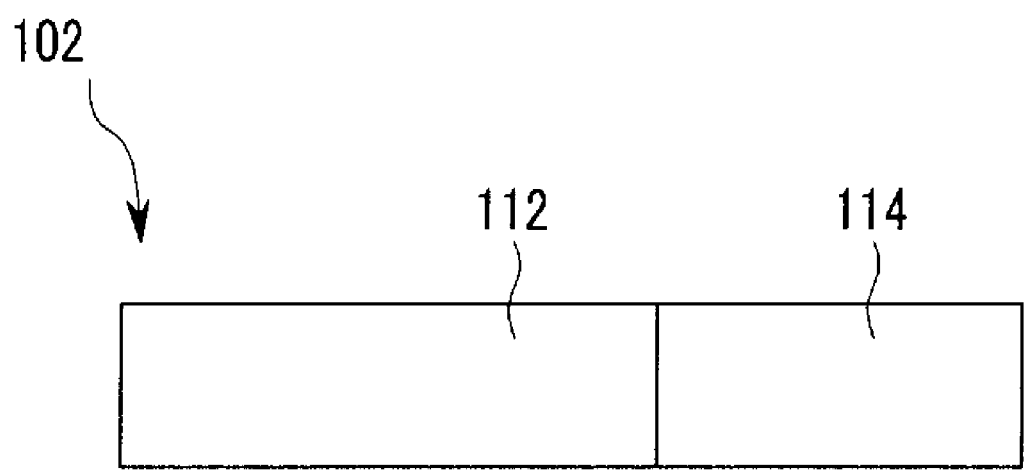
FIG. 5 is a schematic diagram showing a structure of a first catalyst layer in an NOx reduction catalyst according to an exemplary embodiment of the present invention.

As shown in FIG. 3 and FIG. 4, the NOx reduction catalyst 40 includes first and second catalyst layers 44 and 46 coated on a carrier. The first catalyst layer 44 is disposed close to the exhaust gas, and the second catalyst layer 46 is disposed close to the carrier.

The first catalyst layer 44 oxidizes the nitrogen oxide contained in the exhaust gas, and reduces a portion of the oxidized nitrogen oxide through an oxidation-reduction reaction with the hydrocarbon contained in the unburned fuel or the exhaust gas. In addition, the remaining portion of the oxidized nitrogen oxide is diffused into the second catalyst layer 46. The first catalyst layer 44, as shown in FIG. 5, includes at least one of zeolite catalysts 102 and metal catalysts 114 supported in a porous alumina.

The zeolite catalyst 102 is a catalyst where at least one element among copper, platinum, manganese, iron, cobalt, nickel, zinc, silver, cerium, and gallium is ion-exchanged. Chemical reaction occurring in the zeolite catalyst 102 is as follows.

$$Z\text{—}Cu^{2+}O^- + NO \rightarrow Z\text{—}Cu^{2+}(NO_2{}^-)_{ads} \rightarrow Z\text{—}Cu^{2+} + NO_2$$

$$Z^+O^- + NO \rightarrow Z^+(NO_2{}^-)_{ads} \rightarrow Z^+ + NO_2$$

$$Z\text{—}Cu^{2+}(NO_2{}^-)_{ads} + NO \rightarrow Z\text{—}Cu^{2+}N_2O_3{}^-{}_{ads} \rightarrow Z\text{—}Cu^{2+}O^- + N_2 + O_2$$

$$Z\text{—}H^+ + C_nH_{2n} \rightarrow Z\text{—}C_nH_{2n+1}{}^+ \rightarrow n(Z\text{—}H)C_nH_{2n}{}^+$$

$$mNO_2 + C_nH_{2n}{}^+ \rightarrow C_nH_{2n}N_mO_{2m} \rightarrow N_2 + CO_2 + H_2O$$

Here, Z means zeolite, and subscript "ads" means adsorption.

In addition, at least one metal element among platinum, palladium, rhodium, iridium, ruthenium, tungsten, chromium, manganese, iron, cobalt, copper, zinc, and silver may be used for the metal catalysts 114 supported in the porous alumina. Chemical reaction occurring in the metal catalyst 114 supported in the porous alumina is as follows.

$$NO + O_2 \rightarrow (NO_x)_{ads}$$

$$THC + (NO_x)_{ads} \rightarrow THC\text{—}ONO \text{ or } THC\text{—}NO_2$$

$$THC\text{—}NO_2 \rightarrow THC\text{—}NCO$$

$$THC\text{—}NCO + NO + O_2 \rightarrow N_2 + CO_2 + H_2O$$

Herein, THC means hydrocarbon. As described above, the hydrocarbon represents all compounds consisting of carbon and hydrogen contained in the exhaust gas and the fuel.

The second catalyst layer 46 stores the nitrogen oxide diffused from the first catalyst layer 44, and releases the stored nitrogen oxide by a fuel additionally injected in the predetermined period such that the stored nitrogen oxide is reduced at the first catalyst layer 44. As described above, the predetermined period may come when the amount of the nitrogen oxide stored in the second catalyst layer 46 is larger than or equal to a predetermined value such that reduction reaction of the nitrogen oxide is activated in the first catalyst layer 44.

The second catalyst layer 46 includes a noble metal 108 and an NOx storing material 106. Barium oxide (BaO) may be used for the NOx storing material 106. The noble metal 108 helps the NOx storing material 106 to store the nitrogen oxide. Various metal materials such as platinum and palladium may be used for the noble metal 108.

Hereinafter, operation of the present invention will be described in detail.

Nitrogen Oxide Storing Mode

In a case that the amount of the nitrogen oxide stored in the second catalyst layer 46 is small, the nitrogen oxide contained in the exhaust gas is oxidized in the first catalyst layer 44. A portion of the oxidized nitrogen oxide is reduced into nitrogen gas through the oxidation-reduction reaction with the hydrocarbon contained in the exhaust gas. At this stage, the hydrocarbon contained in the exhaust gas is oxidized into carbon dioxide. Chemical reaction occurring in the first catalyst layer 44 is briefly described as follows.

$$NO+1/2O_2 \rightarrow NO_2$$

$$NO+HC \rightarrow 1/2N_2+CO_2$$

In addition, the remaining portion of the oxidized nitrogen oxide and the nitrogen oxide contained in the exhaust gas are diffused into the second catalyst layer 46. At this time, the noble metal 108 of the second catalyst layer 46 helps the NOx storing material 106 to store the nitrogen oxide. Chemical reaction occurring in the second catalyst layer 46 is briefly described as follows.

$$BaO+2NO_2+1/2O_2 \rightarrow BaNO_{32}$$

Nitrogen Oxide Regeneration Mode

In a case that the amount of the nitrogen oxide stored in the second catalyst layer 46 is larger than or equal to the predetermined value, the control portion 50 performs the additional injection of the fuel. The additionally injected fuel passes through the diesel fuel activation material 42, and the fuel is converted into the hydrocarbon of a low molecule at this time. In addition, the portion of the hydrocarbon of the low molecule is converted into the oxygenated hydrocarbon and passes through the NOx reduction catalyst 40.

At this time, the nitrogen oxide is released from the second catalyst layer 46 through the substitution reaction with the hydrocarbon, and this will be briefly described as follows.

$$BaNO_{32}+3CO \rightarrow BaCO_3+2NO+2CO_2$$

In addition, the nitrogen oxide is reduced into the nitrogen gas and the hydrocarbon and the oxygenated hydrocarbon are oxidized into the carbon dioxide in the first catalyst layer 44 through the oxidation-reduction reaction of the released nitrogen oxide with the hydrocarbon and the oxygenated hydrocarbon. This will be briefly described as follows.

$$NO+HC/Oxygenated\ HC=1/2N_2+CO_2$$

Therefore, the nitrogen oxide and the hydrocarbon contained in the exhaust gas are purified.

According to an exemplary embodiment of the present invention, instead of performing the additional injection of the fuel continuously, the additional injection of the fuel may be performed according to the predetermined period. Therefore, hydrocarbon slip may be prevented and fuel mileage may be improved.

According to the present invention, the nitrogen oxide contained in the exhaust gas is temporarily stored, and then is released continuously or periodically by the additional injection of the fuel. Therefore, hydrocarbon slip may be prevented and fuel mileage may be improved.

In addition, since the additional injection of the fuel is performed continuously or periodically, deterioration in durability of the catalyst by oxidation heat may be prevented.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An NOx reduction catalyst mounted at an exhaust pipe through which exhaust gas passes,
    wherein the NOx reduction catalyst comprises first and second catalyst layers coated on a carrier, the first catalyst layer being disposed close to the exhaust gas, and the second catalyst layer being disposed close to the carrier,
    wherein the first catalyst layer reduces a portion of nitrogen oxide contained in the exhaust gas through an oxidation-reduction reaction with an unburned fuel or hydrocarbon contained in the exhaust gas, and diffuses remaining portion of the nitrogen oxide to the second catalyst layer, and
    wherein the second catalyst layer stores the diffused nitrogen oxide, and releases the stored nitrogen oxide by a fuel additionally injected in a predetermined period such that the stored nitrogen oxide is reduced at the first catalyst layer.

2. The NOx reduction catalyst of claim 1, wherein the first catalyst layer comprises at least one of zeolite catalysts and metal catalysts supported in porous alumina.

3. The NOx reduction catalyst of claim 2, wherein the zeolite catalyst is a catalyst where at least one element among copper, platinum, manganese, iron, cobalt, nickel, zinc, silver, cerium, and gallium is ion-exchanged.

4. The NOx reduction catalyst of claim 2, wherein at least one metal element among platinum, palladium, rhodium, iridium, ruthenium, tungsten, chromium, manganese, iron, cobalt, copper, zinc, and silver is supported in the porous alumina.

5. The NOx reduction catalyst of claim 1, wherein the second catalyst layer comprises a noble metal and an NOx storing material.

6. The NOx reduction catalyst of claim 1, wherein the predetermined period comes when the nitrogen oxide in the second catalyst layer is larger than or equal to a predetermined value such that reduction reaction of the nitrogen oxide is activated in the first catalyst layer.

7. The NOx reduction catalyst of claim 1, wherein the additional injection of the fuel is performed through post injection of an injector mounted at an engine or secondary injection of an injector mounted at the exhaust pipe.

8. The NOx reduction catalyst of claim 7, further comprising a diesel fuel activation material disposed at the NOx reduction catalyst, wherein the diesel fuel activation material activates the additionally injected fuel.

9. An exhaust system comprising an NOx reduction catalyst mounted at an exhaust pipe through which exhaust gas passes, wherein the NOx reduction catalyst comprises first and second catalyst layers coated on a carrier, the first catalyst layer being disposed close to the exhaust gas, and the second catalyst layer being disposed close to the carrier, wherein a portion of nitrogen oxide contained in the exhaust gas is oxidized while passing through the first catalyst layer, and the oxidized nitrogen oxide is stored in the second catalyst layer, wherein the nitrogen oxide stored in the second catalyst layer is released through a substitution reaction with an additionally injected fuel, and wherein the released nitrogen oxide is reduced by the additionally injected fuel in the first catalyst layer.

10. The exhaust system of claim 9, wherein supply of the additionally injected fuel is controlled such that a ratio of hydrocarbon to the nitrogen oxide is greater than or equal to a predetermined ratio so as to activate the reduction reaction of the nitrogen oxide in the first catalyst layer.

11. The exhaust system of claim 9, wherein the first catalyst layer comprises at least one of zeolite catalysts and metal catalysts supported in a porous alumina.

12. The exhaust system of claim 11, wherein the zeolite catalyst is a catalyst where at least one element among copper, platinum, manganese, iron, cobalt, nickel, zinc, silver, cerium, and gallium is ion-exchanged.

13. The exhaust system of claim 11, wherein at least one metal element among platinum, palladium, rhodium, iridium, ruthenium, tungsten, chromium, manganese, iron, cobalt, copper, zinc, and silver is supported in the porous alumina.

14. The exhaust system of claim 9, wherein the second catalyst layer comprises a noble metal and an NOx storing material.

15. The exhaust system of claim 9, wherein the additional injection of the fuel is performed through a post injection of an injector mounted at an engine or a secondary injection of an injector mounted at the exhaust pipe.

16. The exhaust system of claim 15, further comprising a diesel fuel activation material disposed at the NOx reduction catalyst, wherein the diesel fuel activation material activates the additionally injected fuel so as to activate the reduction reaction of the nitrogen oxide occurring in the first catalyst layer.

17. The exhaust system of claim 16, further comprising a particulate filter disposed at the exhaust pipe upstream of the diesel fuel activation material, wherein the particulate filter traps particulate materials contained in the exhaust gas.

18. The exhaust system of claim 16, further comprising a particulate filter disposed at the exhaust pipe downstream of the NOx reduction catalyst, wherein the particulate filter traps particulate materials contained in the exhaust gas.

19. The exhaust system of claim 15, wherein the diesel fuel activation material is disposed at the exhaust pipe upstream of the NOx reduction catalyst.

* * * * *